(12) United States Patent
Shi

(10) Patent No.: US 12,060,885 B2
(45) Date of Patent: Aug. 13, 2024

(54) VACUUM PUMP AND ELECTROMAGNET UNIT USED FOR VACUUM PUMP COMPRISING SENSORS AND ELECTROMAGNETS CONNECTED TO TWO SIDES OF A CIRCUIT BOARD

(71) Applicant: Edwards Japan Limited, Yachiyo (JP)

(72) Inventor: Yongwei Shi, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 218 days.

(21) Appl. No.: 17/632,582

(22) PCT Filed: Aug. 17, 2020

(86) PCT No.: PCT/JP2020/031033
§ 371 (c)(1),
(2) Date: Feb. 3, 2022

(87) PCT Pub. No.: WO2021/039478
PCT Pub. Date: Mar. 4, 2021

(65) Prior Publication Data
US 2022/0356883 A1 Nov. 10, 2022

(30) Foreign Application Priority Data
Aug. 23, 2019 (JP) ................... 2019-153295

(51) Int. Cl.
*H02K 11/01* (2016.01)
*F04D 19/04* (2006.01)
*F16C 32/04* (2006.01)
*H02K 11/21* (2016.01)

(52) U.S. Cl.
CPC .......... *F04D 19/04* (2013.01); *F16C 32/0446* (2013.01); *F16C 32/0461* (2013.01);
(Continued)

(58) Field of Classification Search
CPC ............. F16C 32/0446; F16C 32/0461; H02K 11/014; H02K 11/21; H02K 2211/03;
(Continued)

(56) References Cited

U.S. PATENT DOCUMENTS

2002/0117909 A1\* 8/2002 Gomyo .................. H02K 3/522
310/67 R
2007/0132327 A1 6/2007 Brunet
(Continued)

FOREIGN PATENT DOCUMENTS

JP 0414815 A 1/1992
JP 2003307219 A 10/2003
(Continued)

OTHER PUBLICATIONS

WO2017006844A1 English translation (Year: 2023).\*
(Continued)

*Primary Examiner* — Christopher M Koehler
*Assistant Examiner* — Viswanathan Subramanian
(74) *Attorney, Agent, or Firm* — Shumaker & Sieffert, P.A.

(57) ABSTRACT

An electromagnet unit in which influence of a noise on a displacement sensor is suppressed and which can be installed in a space-saving manner and a vacuum pump including the electromagnet unit are provided. An electromagnet unit includes a radial electromagnet which controls a shaft to a predetermined position, a radial sensor which detects a position of the shaft, and a printed board interposed between the radial electromagnet and the radial sensor and on which a wiring pattern for sensor connecting coils of the corresponding two radial sensors to each other and a wiring pattern connecting coils of the corresponding two radial electromagnets to each other are provided. The wiring pattern for sensor and the wiring pattern for electromagnet
(Continued)

are disposed so as not to overlap when seen from the axial direction.

6 Claims, 6 Drawing Sheets

(52) U.S. Cl.
CPC ........... *H02K 11/014* (2020.08); *H02K 11/21* (2016.01); *H02K 2211/03* (2013.01)

(58) Field of Classification Search
CPC .. H02K 7/09; H02K 7/14; F04D 19/04; F04D 19/048; F04D 25/0606; F04D 25/0693; F04D 29/058; F04D 19/042; F04D 19/044
USPC ........................................................ 310/90.5
See application file for complete search history.

(56) References Cited

U.S. PATENT DOCUMENTS

2008/0231128 A1* 9/2008 Buhler .................... F16C 35/00
310/90.5
2019/0024667 A1* 1/2019 Kawashima .......... F04D 17/168
2020/0158118 A1 5/2020 Kawashima

FOREIGN PATENT DOCUMENTS

| JP | 2006083923 A | | 3/2006 | |
|---|---|---|---|---|
| JP | 2008182823 A | | 8/2008 | |
| JP | 2018151378 A | | 9/2018 | |
| KR | 2019059471 A | * | 5/2019 | ........... B60N 2/5657 |
| WO | WO-2017006844 A1 | * | 1/2017 | ........... F04D 17/168 |
| WO | 2018193944 A1 | | 10/2018 | |

OTHER PUBLICATIONS

KR20190059471A English translation (Year: 2023).*
JP2003307219A English translation (Year: 2023).*
International Search Report and Written Opinion of International Application No. PCT/JP2020/031033, dated Sep. 14, 2020, 9 pp.
Extended Search Report from counterpart European Application No. 20858399.7 dated Aug. 10, 2023, 42 pp.
Response to Extended Search Report dated Aug. 10, 2023, from counterpart European Application No. 20858399.7 filed Nov. 3, 2023, 19 pp.

* cited by examiner

VACUUM PUMP AND ELECTROMAGNET UNIT USED FOR VACUUM PUMP COMPRISING SENSORS AND ELECTROMAGNETS CONNECTED TO TWO SIDES OF A CIRCUIT BOARD

This application is a U.S. national phase application under 35 U.S.C. § 371 of international application number PCT/JP2020/031033 filed on Aug. 17, 2020, which claims the benefit of JP application number 2019-153295 filed on Aug. 23, 2019. The entire contents of each of international application number PCT/JP2020/031033 and JP application number 2019-153295 are incorporated herein by reference.

TECHNICAL FIELD

The present disclosure relates to a vacuum pump and an electromagnet unit used for a vacuum pump.

BACKGROUND

In manufacture of a semiconductor device such as a memory, an integrated circuit and the like, processing of forming films such as an insulating film, a metal film, a semiconductor film and the like and processing of etching are performed in a process chamber in a high-vacuum state in order to avoid influences of dusts and the like in the air. For exhaust inside the process chamber, a vacuum pump such as a turbo-molecular pump or the like is used, for example.

As the vacuum pump as above, the one in which a turbo-molecular mechanism having blades and stator blades alternately arranged in multiple stages in an axial direction in a casing having an inlet port for sucking a gas from an outside and an outlet port for exhausting the sucked gas to the outside is known.

Moreover, the vacuum pump includes an electromagnet unit which executes position control of a rotating shaft on the basis of displacement of the rotating shaft having the blades provided that is detected by various sensors. The electromagnet unit cannot normally conduct displacement detection of the rotating shaft if a displacement sensor which conducts displacement detection of the rotating shaft is subjected to interference of an outside noise.

Thus, in order to reduce such noises, a noise generating source and the displacement sensor are provided away from each other or a shield as disclosed in Japanese Utility Model Application Publication No. H04-14815 is provided. This shield is interposed at least either one of between a radial electromagnet and a displacement sensor for radial direction and between a high-frequency motor and the displacement sensor for radial direction and shields a magnetic field and an electric field of the radial electromagnet or the high-frequency motor related to the sensor for radial direction.

SUMMARY

However, when the noise generating source and the displacement sensor are provided away from each other, there was a need to ensure such an excessive separation distance that they are not subjected to the influence of the noise easily by considering variation in assembling accuracy.

Moreover, in the vacuum pump including the aforementioned shield, there was a problem that a size of the vacuum pump is increased in the axial direction by a portion for interposing such a shield that shields the magnetic field and the electric field of the radial electromagnet or the high-frequency motor.

Thus, a technical problem which should be solved in order to suppress the displacement sensor to be influenced by the noise and to provide the electromagnet unit in a space-saving manner is generated, and the present disclosure has an object to solve the problem.

In order to achieve the aforementioned object, the vacuum pump according to the present disclosure is a vacuum pump including an electromagnet unit which executes position control of a rotating shaft, and the electromagnet unit includes a displacement sensor which detects a position of the rotating shaft, an electromagnet which controls the rotating shaft to a predetermined position, and a printed board interposed between the displacement sensor and the electromagnet and on which a wiring pattern for sensor connecting coils of the corresponding two displacement sensors to each other and a wiring pattern for electromagnet connecting the coils of the corresponding two electromagnets are provided to each other, in which the wiring pattern for sensor and the wiring pattern for electromagnet are disposed so that the wiring patterns do not overlap when seen from an axial direction of the rotating shaft.

According to this configuration, by separating the wiring pattern for sensor and the wiring pattern for electromagnet from each other, interference with the displacement sensor by an electromagnetic noise generated in the electromagnet is suppressed, and misdetection or nonconformity of the displacement sensor caused by the electromagnetic noise can be prevented.

Moreover, in the vacuum pump according to the present disclosure, it is preferable that the wiring pattern for sensor is disposed on one surface side of the printed board, and the wiring pattern for electromagnet is disposed on the other surface side of the printed board.

According to this configuration, by separating the wiring pattern for sensor and the wiring pattern for electromagnet from each other in the axial direction, interference with the displacement sensor by an electromagnetic noise generated in the electromagnet is suppressed, and misdetection or nonconformity of the displacement sensor caused by the electromagnetic noise can be prevented.

Furthermore, according to the vacuum pump according to the present disclosure, it is preferable that the wiring pattern for electromagnet is disposed on an outer side of the wiring pattern for sensor in a radial direction of the rotating shaft.

According to this configuration, by separating the wiring pattern for sensor and the wiring pattern for electromagnet from each other in the radial direction, interference with the displacement sensor by an electromagnetic noise generated in the electromagnet is suppressed and thus, misdetection or nonconformity of the displacement sensor caused by the electromagnetic noise can be prevented.

Furthermore, in the vacuum pump according to the present disclosure, it is preferable that a land where the coil of the electromagnet and the wiring pattern for electromagnet are solder-connected is disposed so as not to overlap a core of the displacement sensor when seen from the axial direction.

According to this configuration, interference with the displacement sensor via the land by the electromagnetic noise generated in the electromagnet can be suppressed.

Furthermore, in the vacuum pump according to the present disclosure, a lead wire connecting the wiring pattern for sensor or the wiring pattern for electromagnet to an external device is preferably extended along the axial direction so as not to overlap an electromagnetic steel-plate of the electromagnet and a sensor steel-plate of the displacement sensor when seen from the axial direction.

According to this configuration, since the lead wire does not overlap the electromagnetic steel-plate of the electromagnet and the sensor steel-plate of the displacement sensor when seen from the axial direction, interference with the displacement sensor by the electromagnetic noise generated in the lead wire can be suppressed.

Furthermore, in the vacuum pump according to the present disclosure, it is preferable that magnetic poles adjacent to each other between the electromagnets adjacent to each other in a circumferential direction of the electromagnet are set to have the same poles.

According to this configuration, since magnetic fluxes generated from the magnetic poles adjacent to each other between the electromagnets adjacent to each other in the circumferential direction of the electromagnet are offset, the magnetic fluxes of the electromagnet can be lowered between the electromagnets adjacent to each other in the circumferential direction.

Moreover, in order to achieve the aforementioned object, the electromagnet unit according to the present disclosure is an electromagnet unit which executes position control of the rotating shaft of the vacuum pump, includes a displacement sensor which detects a position of the rotating shaft, an electromagnet which controls the rotating shaft to a predetermined position, and a printed board interposed between the displacement sensor and the electromagnet and on which a wiring pattern for sensor connecting the coils of the corresponding two displacement sensors to each other and a wiring pattern for electromagnet connecting the coils of the corresponding two electromagnets to each other are provided, and the wiring pattern for sensor and the wiring pattern for electromagnet are disposed so as not to overlap when seen from the axial direction of the rotating shaft.

According to this configuration, by separating the wiring pattern for sensor and the wiring pattern for electromagnet from each other, interference with the displacement sensor by the electromagnetic noise generated in the electromagnet is suppressed, and misdetection or nonconformity of the displacement sensor caused by the electromagnetic noise can be prevented.

According to the disclosure, by separating the wiring pattern for sensor and the wiring pattern for electromagnet from each other, interference with the displacement sensor by the electromagnetic noise generated in the electromagnet is suppressed, and misdetection or nonconformity of the displacement sensor caused by the electromagnetic noise can be prevented.

DETAILED DESCRIPTION

An example of the present disclosure will be described on the basis of the drawings. In the following, when the numbers, numerical values, quantities, ranges, and the like of constituent elements are referred to, except a particularly explicitly specified case or a case explicitly limited to a specific number in principle, they are not limited to this and may be larger or smaller than the specific number.

Moreover, when shapes and positional relationships of the constituent elements and the like are referred to, except a particularly explicitly specified case, a case considered to be explicitly otherwise in principle and the like, those substantially proximate or similar to the shape and the like are included.

Furthermore, the drawings are exaggerated by enlarging a featured part in order to facilitate understanding of the feature or the like in some cases, and dimensional rates and the like of the constituent elements are not always the same as the actuality. Moreover, in sectional views, hatching of a part of the constituent elements is omitted in some cases in order to facilitate understanding of sectional structures of the constituent elements.

Figure 1:
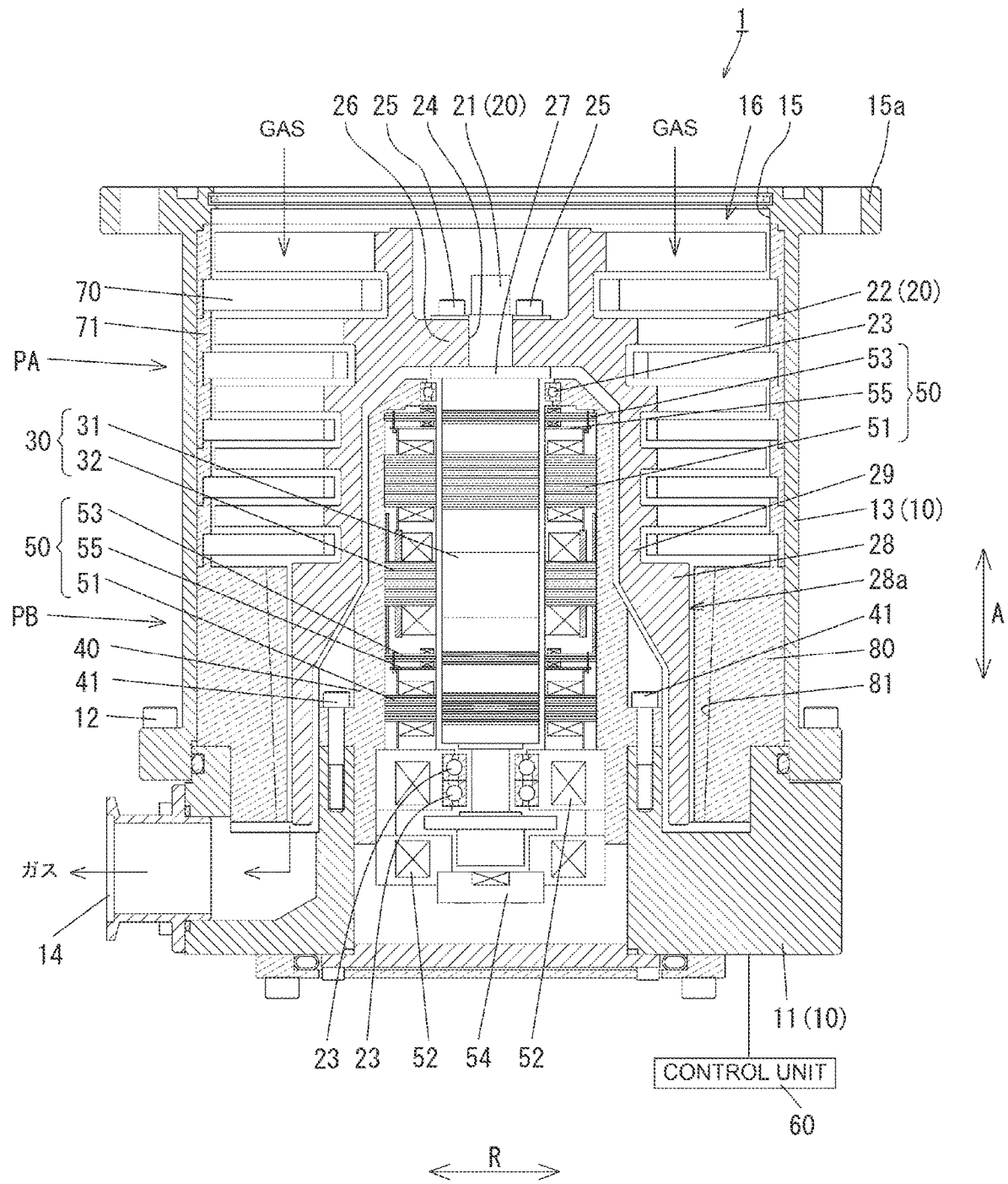
FIG. 1 is a longitudinal sectional view of a vacuum pump according to an example of the present disclosure.

FIG. 1 is a longitudinal sectional view illustrating a vacuum pump 1. The vacuum pump 1 is a composite pump constituted by a turbo-molecular pump mechanism PA and a thread-groove pump mechanism PB accommodated in a substantially cylindrical casing 10.

The vacuum pump 1 includes the casing 10, a rotor 20 having a shaft 21 rotatably supported in the casing 10, a motor 30 which rotates/drives the shaft 21, and a stator column 40 which accommodates a part of the shaft 21 and the motor 30.

The casing 10 is constituted by a base 11 and a cylinder portion 13 fixed through a bolt 12 in a state placed on the base 11.

On a lower side part of the base 11, an exhaust port 14 communicating with an auxiliary pump, not shown, is provided.

On an upper end of the cylinder portion 13, an inlet port 15 connected to a vacuum vessel such as a chamber or the like, not shown, is formed. Moreover, on an outer periphery of the inlet port 15, a flange 15a connected to the vacuum vessel is formed.

The rotor 20 includes the shaft 21 and blades 22 fixed to an upper part of the shaft 21 and provided side by side concentrically with respect to an axis of the shaft 21. The blade 22 and a rotating body 28 which will be described later are joined integrally and constitute a substantially cylindrical rotor blade 29.

The shaft 21 is positionally controlled by a radial electromagnet unit and an axial electromagnet unit and supported in a non-contact manner. The radial electromagnet unit is an electromagnet unit 50 and includes a radial electromagnet 51, a radial sensor 53, and a printed board 55. The axial electromagnet unit includes an axial electromagnet 52 and an axial sensor 54.

The radial electromagnet 51, the axial electromagnet 52, the radial sensor 53, and the axial sensor 54 are connected to a control unit 60 which controls various devices constituting the vacuum pump 1.

The control unit 60 controls an exciting current of the radial electromagnet 51 and the axial electromagnet 52 on the basis of a detected value of the radial sensor 53 which detects displacement of the shaft 21 in a radial direction R and a detected value of the axial sensor 54 which detects displacement of the shaft 21 in an axial direction A so that the shaft 21 is supported in a state floating at a predetermined position.

An upper part and a lower part of the shaft 21 is inserted into a touchdown bearing 23. If the shaft 21 becomes uncontrollable, the shaft 21 rotating at a high speed is brought into contact with the touchdown bearing 23 so as to prevent damage on the vacuum pump 1.

The shaft 21 is integrally mounted on the rotor blade 29 by inserting a bolt 25 in a rotor flange 26 and screwing the bolt 25 with a shaft flange 27 in a state where the upper part is inserted into a boss hole 24.

The motor 30 is constituted by a rotator 31 mounted on an outer periphery of the shaft 21 and a motor stator 32 disposed so as to surround the rotator 31. The motor stator 32 is connected to the control unit 60, and rotation of the shaft 21 is controlled by the control unit 60.

The stator column 40 has a lower end portion of the stator column 40 fixed to the base 11 through a bolt 41 in a state placed on the base 11.

Subsequently, the turbo-molecular pump mechanism PA disposed substantially on an upper half of the vacuum pump 1 will be described.

The turbo-molecular pump mechanism PA is constituted by the blade 22 and a stator blade 70 disposed with a clearance from the blade 22 in the axial direction A. The blades 22 and the stator blades 70 are alternately arranged and in multiple stages along the axial direction A, and in this example, the blades 22 in five stages and the stator blades 70 in five stages are arranged.

The blade 22 is inclined at a predetermined angle and is formed integrally on an upper-part outer peripheral surface of the rotor blade 29. Moreover, the blades 22 are installed in plural radially around the axis of the rotor 20.

The stator blade 70 is constituted by a blade inclined in a direction opposite to that of the blade 22 and is sandwiched in the axial direction A and positioned by spacers 71 installed in stages on an inner wall surface of the cylinder portion 13. Moreover, the stator blades 70 are also installed in plural radially around the axis of the rotor 20.

The turbo-molecular pump mechanism PA as described above is constituted to transfer the gas sucked through the inlet port 15 and the suction port 16 from above to below in the axial direction A by means of rotation of the blades 22.

Subsequently, the thread-groove pump mechanism PB disposed on substantially on a lower half of the vacuum pump 1 will be described.

The thread-groove pump mechanism PB includes the rotating body 28 provided on a lower part of the rotor 20 and extending along the axial direction A and a substantially cylindrical stator 80 disposed by surrounding an outer peripheral surface 28a of the rotating body 28.

The stator 80 is placed on the base 11. The stator 80 includes a thread-groove portion 81 engraved in an inner peripheral surface.

The thread-groove pump mechanism PB as described above compresses the gas transferred from the inlet port 15 and the suction port 16 to below in the axial direction A by a drag effect by high-speed rotation of the rotating body 28 and transfers it toward the exhaust port 14. Specifically, the gas is transferred to the clearance between the rotating body 28 and the stator 80 and then, compressed in the thread-groove portion 81 and transferred to the exhaust port 14.

Figure 2:
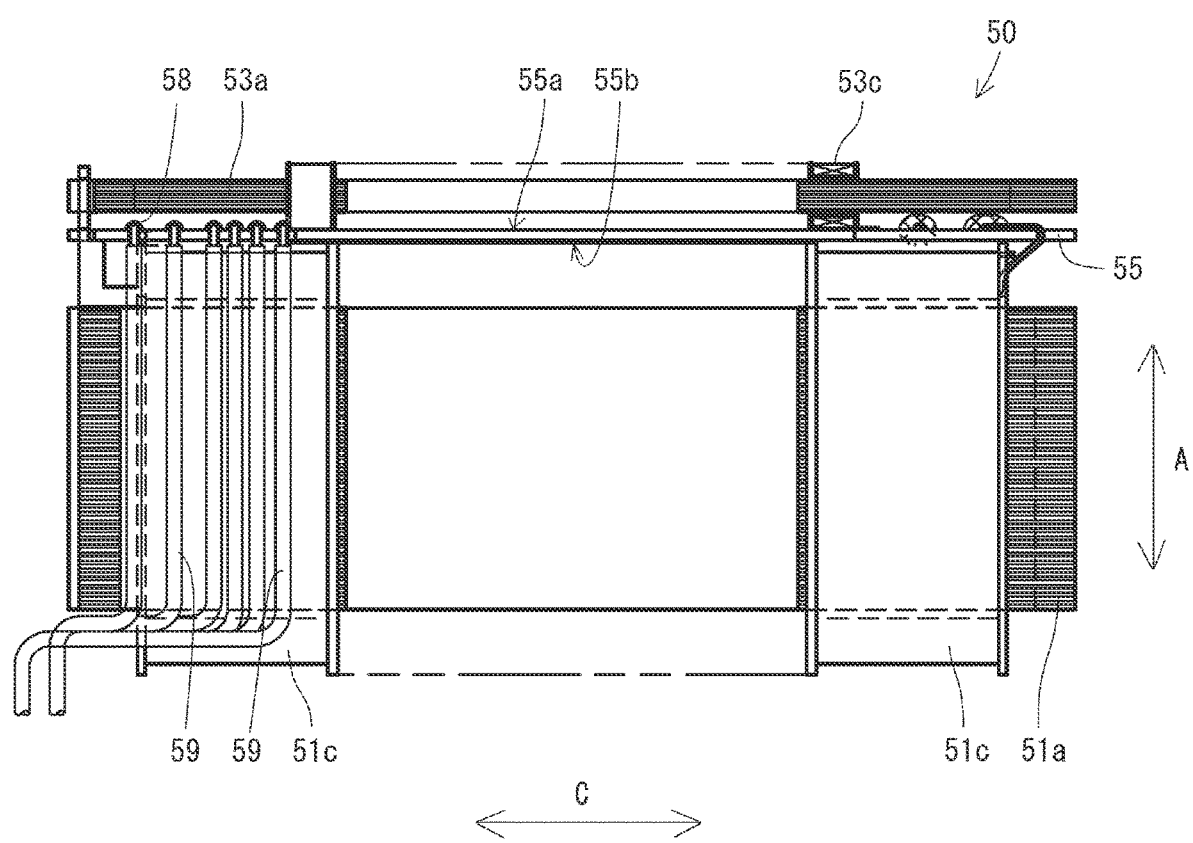
FIG. 2 is a side view illustrating an electromagnet unit.
Figure 3:
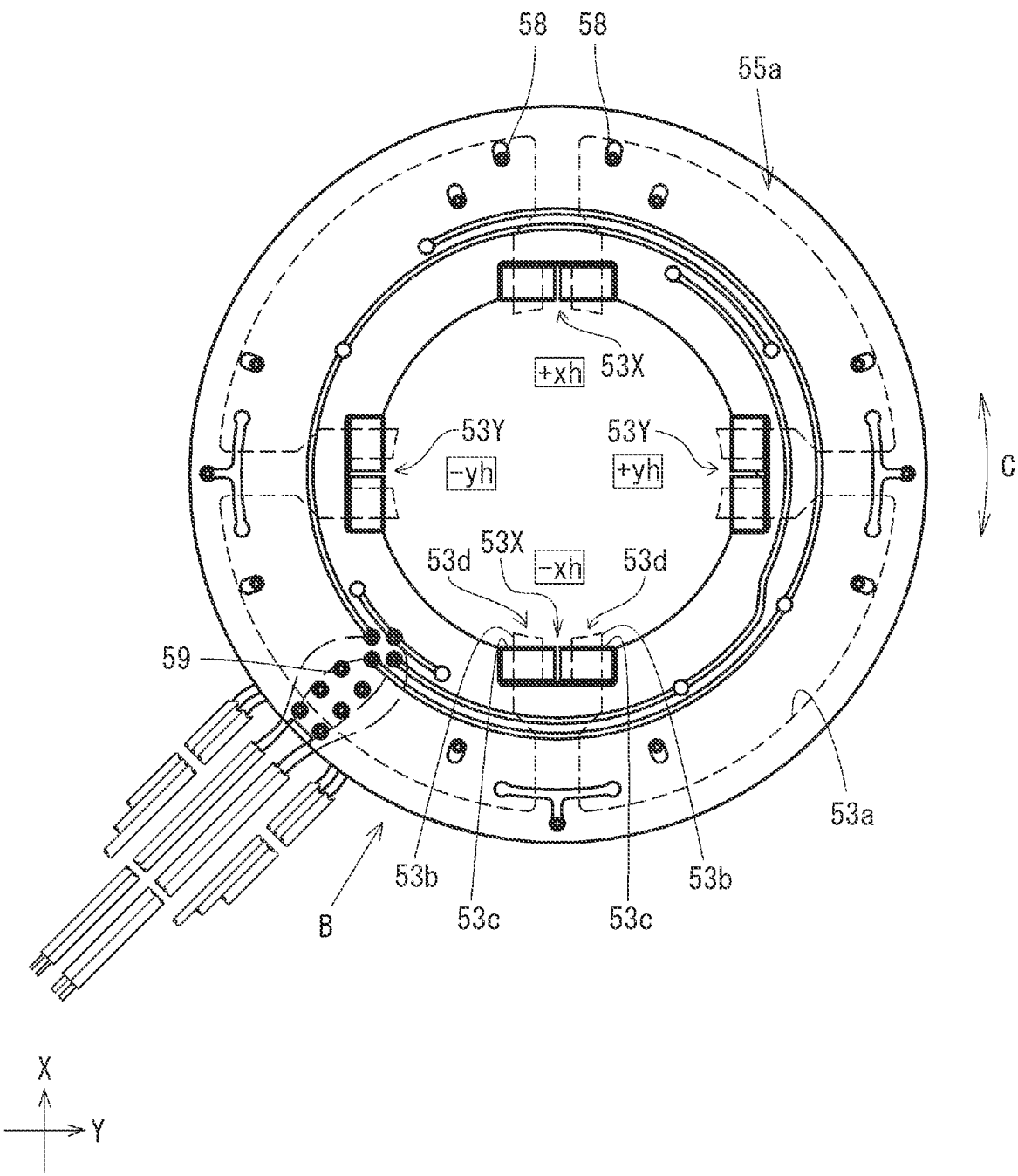
FIG. 3 is a plan view illustrating a printed board.
Figure 4:
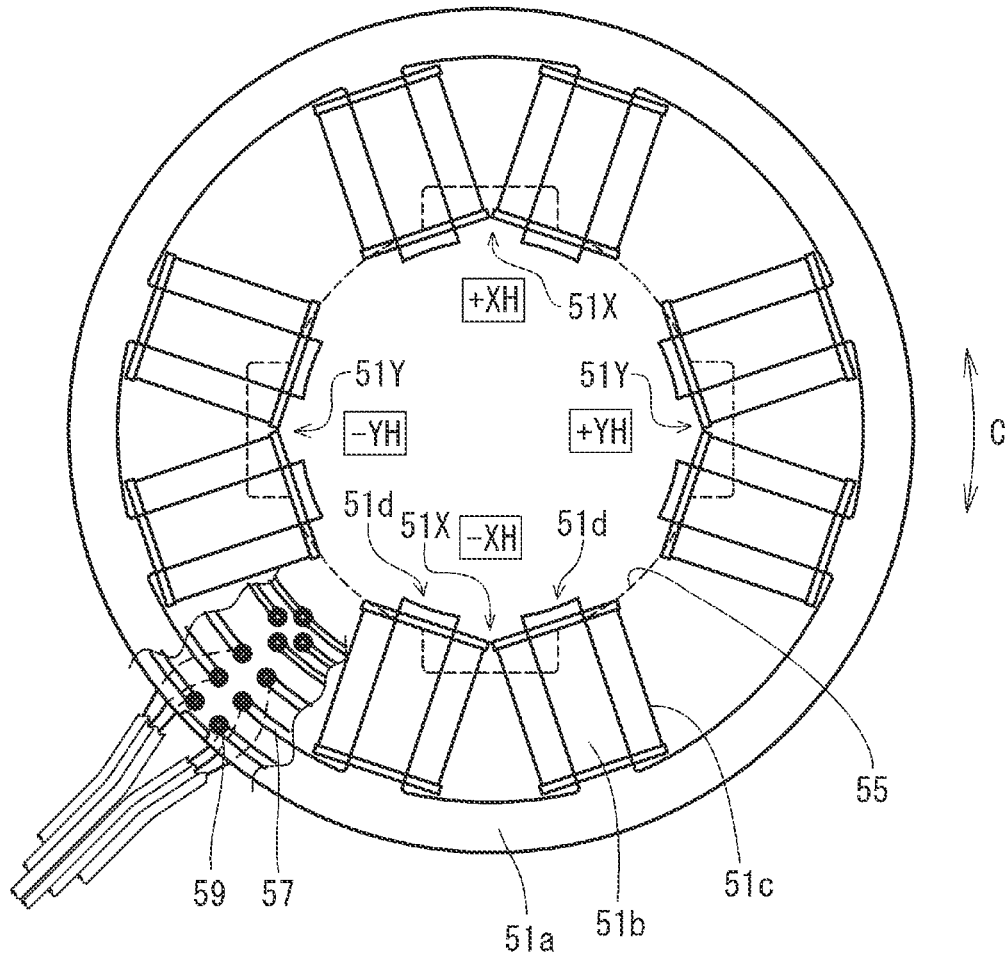
FIG. 4 is a partially-notched bottom view illustrating a radial sensor.
Figure 5:
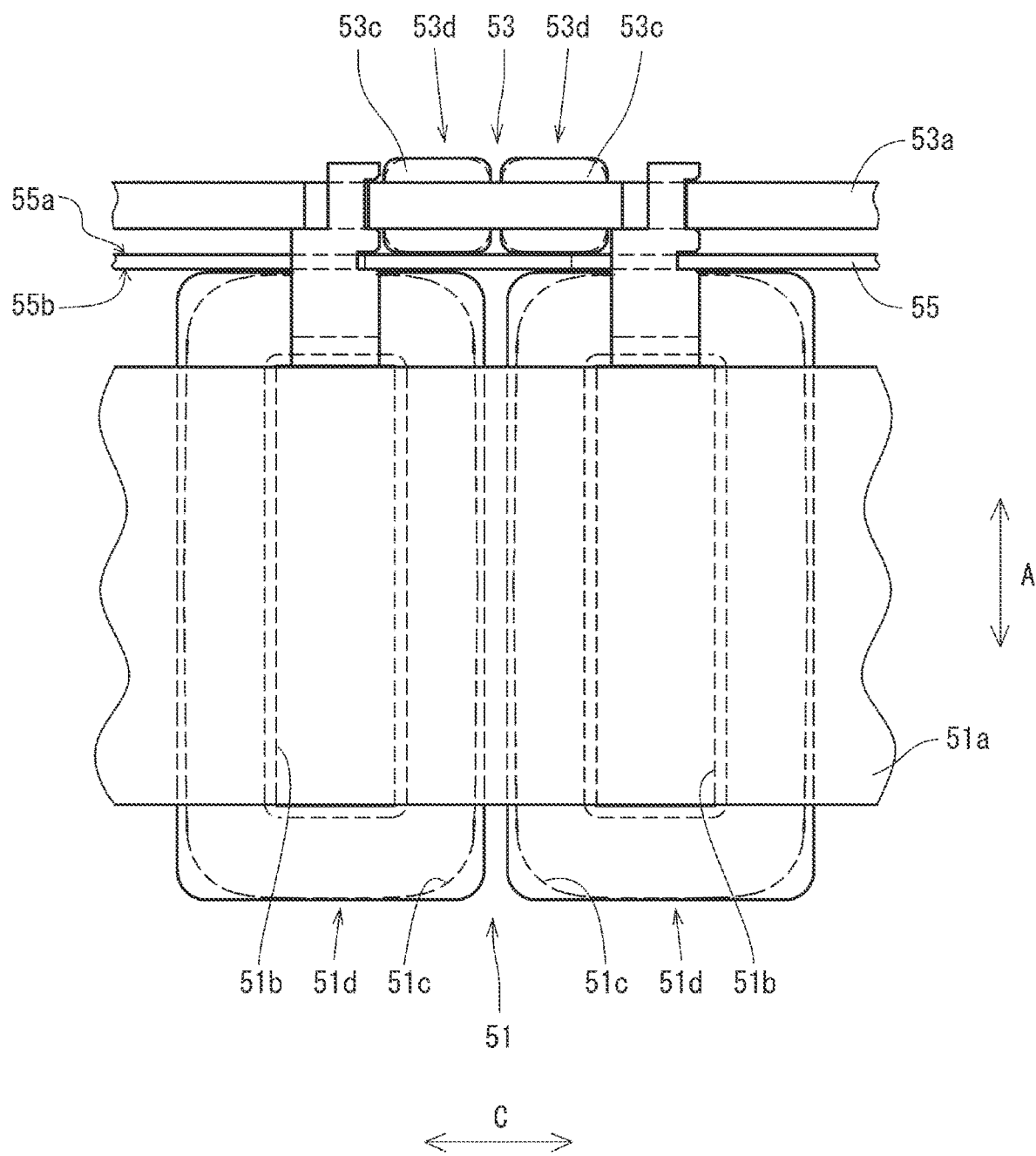
FIG. 5 is a side view illustrating the electromagnet unit when seen from an arrow B in FIG. 3.

Subsequently, a constitution and an action of the electromagnet unit 50 will be described on the basis of the drawings. FIG. 2 is a side view illustrating the electromagnet unit 50. FIG. 3 is a plan view of the printed board 55 illustrating a disposition relationship of the radial sensor 53 by a broken line. FIG. 4 is a partially-notched bottom view of the radial sensor 53 illustrating the disposition relationship of the printed board 55 by a broken line. FIG. 5 is a side view illustrating the electromagnet unit 50 when seen from the arrow B in FIG. 3.

Note that, in FIG. 1, the radial electromagnets 51 and the radial sensors 53 are provided two each away from each other in the axial direction A, but since they have the similar constitutions, the structures will be described by using the radial electromagnet 51 and the radial sensor 53 disposed above in the axial direction A as examples, and the description relating to the structures of the radial electromagnet 51 and the radial sensor 53 disposed below in the axial direction A is omitted.

The radial electromagnet 51 supports the shaft 21 in the radial direction R by a magnetic force in a non-contact manner. Each of the radial electromagnets 51 is disposed away from each other at 90 degrees each along a circumferential direction C of the electromagnet unit 50 and disposed on an X-axis or a Y-axis. Note that, in this example, in the case where the radial electromagnets 51 are discriminated in accordance with the direction in which the radial electromagnet 51 supports the shaft 21, those supporting the shaft 21 in the X-axis direction in the non-contact manner are given "X" at the end of numerals as reference signs, while those supporting the shaft 21 in the Y-axis direction in the non-contact manner are given "Y" at the end of the numerals as the reference signs, and when they are collectively referred to, only numerals are used as reference signs.

The radial electromagnet 51 includes a pair of magnetic poles 51d and 51d formed by winding a coil 51c around a protruding portion 51b of the electromagnetic steel-plate 51a which is a core. The pair of magnetic poles 51d and 51d have different polarities by winding the coils 51c in directions opposite to each other.

The magnetic poles 51d and 51d adjacent to each other between the radial electromagnets 51X and 51Y adjacent to each other in the circumferential direction C are set to have the same polarities as each other. As a result, since the magnetic fluxes generated from the magnetic poles 51d and 51d adjacent to each other between the radial electromagnets 51 adjacent to each other in the circumferential direction C are offset, the magnetic fluxes of the radial electromagnet 51 can be lowered between the radial electromagnets 51X and 51Y adjacent to each other in the circumferential direction C.

The radial sensor 53 detects displacement of the shaft 21 in the radial direction R. The radial sensor 53 is a known displacement sensor such as an inductance-type displacement sensor or the like, for example. The radial sensor 53 includes a pair of magnetic poles 53d and 53d formed by winding a coil 53c around a claw portion 53b of a sensor steel-plate 53a which is a core.

The radial sensor 53 is disposed between the pair of magnetic poles 53d and 53d when seen from a plane. Note that, in this example, in the case where the radial sensors 53 are discriminated in accordance with a detection direction of displacement, those disposed on the X-axis are given "X" at the end of numerals as reference signs, while those disposed on the Y-axis are given "Y" at the end of the numerals as the reference signs, and when they are collectively referred to, only numerals are used as reference signs.

Figure 6:
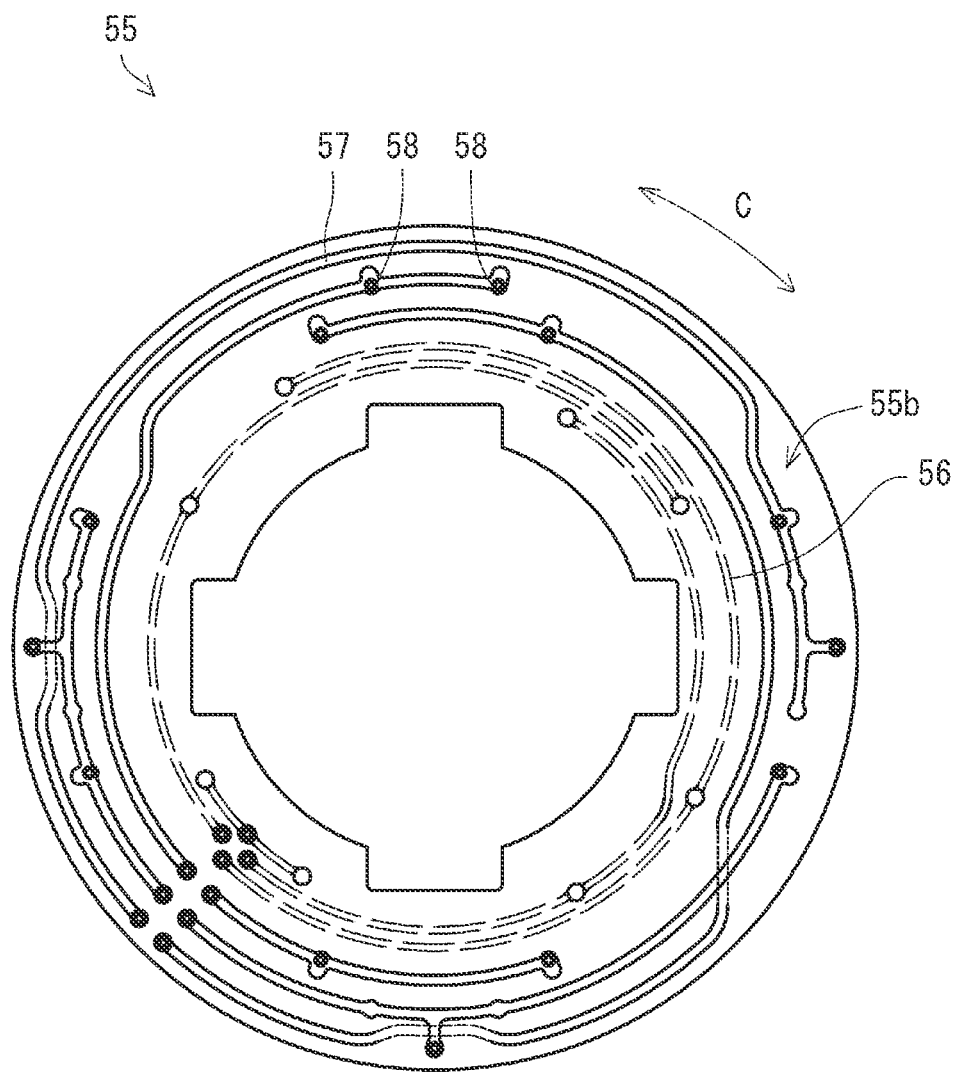
FIG. 6 is a bottom view illustrating the printed board.

The radial electromagnet 51 and the radial sensor 53 are disposed on sides opposite to each other with the printed board 55 between them in the axial direction A. FIG. 6 is a bottom view illustrating the printed board 55.

On the printed board 55, a wiring pattern 56 for sensor connecting the coils 53c of the radial sensor 53 and a wiring pattern 57 for electromagnet connecting the coils 51c of the radial electromagnet 51 are provided.

The wiring pattern 56 for sensor and the wiring pattern 57 for electromagnet are disposed so as not to overlap when seen from the axial direction A. As a result, since the wiring pattern 56 for sensor and the wiring pattern 57 for electromagnet are separated in the axial direction A, interference with the radial sensor 53 by the electromagnetic noise generated in the radial electromagnet 51 can be suppressed. Note that, if the electromagnetic noise generated in the radial electromagnet 51 does not interfere with the radial sensor 53, the wiring pattern 56 for sensor and the wiring pattern 57 for electromagnet may be disposed to be partially overlapped when seen from the axial direction A.

Specifically, the wiring pattern 56 for sensor is provided on a surface 55a of the printed board 55. The wiring pattern 56 for sensor connects the coils 53c to each other of the radial sensors 53x disposed by facing each other or the coils 53c to each other of the radial sensors 53y disposed by facing each other.

Moreover, the wiring pattern 57 for electromagnet is provided on a rear surface 55b of the printed board 55. The wiring pattern 57 for electromagnet connects the coils 51c to each other of the radial electromagnets 51X disposed by facing each other or the coils 51c to each other of the radial electromagnets 51Y disposed by facing each other.

And when seen from the axial direction A, the wiring pattern 56 for sensor is disposed closer to an inner side in the radial direction R than the wiring pattern 57 for electromagnet. As a result, since the wiring pattern 56 for sensor and the wiring pattern 57 for electromagnet are separated in the radial direction R, the interference with the radial sensor 53 by the electromagnetic noise generated in the radial electromagnet 51 can be suppressed.

Moreover, in the printed board 55, a land 58 where the coil 51c of the radial electromagnet 51 and the wiring pattern 57 for electromagnet are solder-connected is disposed so as not to overlap the sensor steel-plate 53a of the radial sensor 53 when seen from the axial direction A. As a result, interference with the radial sensor 53 via the land 58 by the electromagnetic noise generated in the radial electromagnet 51 can be suppressed. Note that, if the electromagnetic noise generated in the radial electromagnet 51 does not interfere with the radial sensor 53 via the land 58, the land 58 may be disposed so as to overlap a part of the sensor steel-plate 53a of the radial sensor 53 when seen from the axial direction A. Moreover, since the land 58 is provided on the surface 55a above in the axial direction A of the printed board 55, a worker can easily access the land 58 and can perform soldering smoothly.

Moreover, a lead wire 59 connecting the wiring pattern 56 for sensor or the wiring pattern 57 for electromagnet to an external device is extended along the axial direction A between the coils 51c of the radial electromagnets 51 adjacent to each other in the circumferential direction C. As a result, since the lead wire 59 does not overlap the electromagnetic steel-plate 51a and the sensor steel-plate 53a when seen from the axial direction A, interference with the radial sensor 53 by the electromagnetic noise generated in the lead wire 59 can be suppressed. By means of such wiring, the lead wire 59 can be routed to an outer peripheral side of the electromagnet unit 50 without generating forced bending. Moreover, a size increase of the vacuum pump 1 in the axial direction A caused by the routing of the lead wire can be prevented. Note that, if the electromagnetic noise generated in the lead wire 59 does not interfere with the radial sensor 53, the lead wire 59 may be disposed so as to overlap a part of the electromagnetic steel-plate 51a or a part of the sensor steel-plate 53a when seen from the axial direction A.

Note that, the wiring pattern 56 for sensor and the wiring pattern 57 for electromagnet only need to be separated by such a distance that can reduce the influence of the electromagnetic noise, and they may be provided altogether on either one of the surface 55a and the rear surface 55b of the printed board 55.

In this way, the electromagnet unit 50 according to this example can suppress interference with the radial sensor 53 by the electromagnetic noise generated in the radial electromagnet 51 and prevent misdetection or nonconformity of the radial sensor 53 caused by the electromagnetic noise by separating the wiring pattern 56 for sensor and the wiring pattern 57 for electromagnet in the axial direction A.

And in the electromagnet unit 50 as above, the radial sensors 53x disposed by facing each other detect the displacement in the X-axis direction of the upper part of the shaft 21 and send original displacement signals +xh and −xh corresponding to this displacement to the control unit 60.

Moreover, the radial sensors 53y disposed by facing each other detect the displacement in the Y-axis direction of the shaft 21 and send the original displacement signal +yh and −yh corresponding to this displacement to the control unit 60.

Note that the reference sign "+" in the original displacement signal indicates the signal detected by the radial sensors 53x or 53y disposed in a positive direction of the X-axis or the Y-axis, and the reference sign "−" indicates the signal detected by the radial sensor 53x or 53y disposed in a negative direction of the X-axis or the Y-axis.

The control unit 60 generates electromagnet drive signals +XH and −XH which causes the radial electromagnet 51X of the electromagnet unit 50 to be driven on the basis of the displacement of the shaft 21 in the X-axis direction and in the Y-axis direction and controls the radial electromagnet 51X.

Moreover, the control unit 60 generates electromagnet drive signals +YH and −YH which causes the radial electromagnet 51Y of the electromagnet unit 50 to be driven and controls the radial electromagnet 51Y.

Note that the reference sign "+" in the electromagnet drive signal indicates the signal for controlling the radial electromagnet 51 disposed in the positive direction of the X-axis or the Y-axis, and the reference sign "−" indicates the signal for controlling the radial electromagnet 51 disposed in the negative direction of the X-axis or the Y-axis.

Note that various modifications can be made in the present disclosure as long as the spirit of the present disclosure is not departed, and it is needless to say that the present disclosure extends to the modifications.

What is claimed is:

1. A vacuum pump including an electromagnet unit which executes position control of a rotating shaft, wherein the electromagnet unit includes:
   a plurality of radial sensors which detect a position of the rotating shaft,
   a plurality of electromagnets which control the rotating shaft to a predetermined position, and
   a printed board interposed between the radial sensors and the electromagnets and on which a wiring pattern for sensor connecting coils of two corresponding radial sensors of the plurality of radial sensors to each other and a wiring pattern for the electromagnet connecting the coils of two corresponding electromagnets of the plurality of electromagnets to each other are provided; and the wiring pattern for the sensor connecting coils and the wiring pattern for the electromagnet are disposed so that they do not overlap when seen from an axial direction of the rotating shaft, the wiring pattern for the sensor connecting coils is disposed on a first surface side of the printed board, and the wiring pattern for the electromagnet is disposed on a second surface side of the printed board opposite the first surface side.

2. The vacuum pump according to claim 1, wherein the wiring pattern for electromagnet is disposed on an outer side of the wiring pattern for the sensor connecting coils in a radial direction of the rotating shaft.

3. The vacuum pump according to claim 1, wherein:

a land where the coil of a respective electromagnet and the wiring pattern for the electromagnet are solder-connected is disposed so as not to overlap a core of a respective radial sensor when seen from the axial direction.

4. A vacuum pump according to claim 1, wherein a lead wire connecting the wiring pattern for sensor or the wiring pattern for electromagnet to an external device extends along the axial direction so as not to overlap an electromagnetic steel-plate of a respective electromagnet and a sensor steel-plate of a respective radial sensor when seen from the axial direction.

5. A vacuum pump according to claim 4, wherein magnetic poles adjacent to each other between the electromagnets adjacent to each other in a circumferential direction of the electromagnet are set to have the same poles.

6. An electromagnet unit which executes position control of a rotating shaft of a vacuum pump, comprising:

a plurality of radial sensors which detect a position of the rotating shaft, a plurality of electromagnets which control the rotating shaft to a predetermined position, and a printed board interposed between the radial sensors and the electromagnets and on which a wiring pattern for sensor connecting coils of two corresponding radial sensors of the plurality of radial sensors to each other and a wiring pattern for the electromagnet connecting the coils of two corresponding electromagnets of the plurality of electromagnets to each other are provided, wherein the wiring pattern for the sensor connecting coils and the wiring pattern for the electromagnet are disposed so as not to overlap when seen from an axial direction of the rotating shaft, the wiring pattern for the sensor connecting coils is disposed on a first surface side of the printed board, and the wiring pattern for the electromagnet is disposed on a second surface side of the printed board opposite the first surface side.

\* \* \* \* \*